Oct. 20, 1959   F. P. EMERY   2,909,672
ELECTRIC GOVERNOR FOR PRIME MOVERS
Filed Oct. 28, 1957   4 Sheets-Sheet 1

WITNESSES:
Bernard R. Gieguey
Leon J. Taja

INVENTOR
Frederic P. Emery
BY
Paul E. Friedemann
ATTORNEY

Oct. 20, 1959 F. P. EMERY 2,909,672
ELECTRIC GOVERNOR FOR PRIME MOVERS
Filed Oct. 28, 1957 4 Sheets-Sheet 3

Oct. 20, 1959 F. P. EMERY 2,909,672
ELECTRIC GOVERNOR FOR PRIME MOVERS
Filed Oct. 28, 1957 4 Sheets-Sheet 4

United States Patent Office 2,909,672
Patented Oct. 20, 1959

2,909,672

ELECTRIC GOVERNOR FOR PRIME MOVERS

Frederic P. Emery, Williamsville, N.Y., assignor to Westinghouse Electric Corporation, East Pittsburgh, Pa., a corporation of Pennsylvania Application October 28, 1957, Serial No. 692,946

20 Claims. (Cl. 307—57)

This invention relates to electric systems of control including magnetic amplifiers, and more particularly to systems of control, for governing the operation of a prime mover, or prime movers, coupled to drive electric generators, or sets of generators, as for example alternators.

The trend in recent years to expect higher and higher performance from electric generating equipment has reached the point of necessitating higher performance from the prime movers driving the generating equipment. These higher performance requirements are essential needs and include, closer steady-state control of electric frequency of, say, an alternator driven by a prime mover, more reliable and effective load sharing among two or more generating units coupled to prime movers, and, especially, very rapid recovery from transient load changes.

One broad object of this invention is the provision of accurate and reliable electric governing control means for the prime mover driving electric generating means.

Another broad object of this invention is the provision of means to hold a close steady-state control of the frequency of an alternator coupled to a prime mover.

Another object of this invention is the provision of means to enable the prime mover driving an alternator to sooner than somewhat similar prior art controls anticipate a change in frequency due to a change in load and to readjust the throttle position of the prime mover before there is a frequency change.

It is also an object of this invention to use smaller and less expensive components than used heretofore and yet to obtain an overall higher standard of performance than was possible to obtain heretofore.

It is also an object of this invention to provide for interchangeable use of all components, or parts, regardless of the frequency output of the alternator or service application involved, as for example, service applications involving 15 cycles, 25 cycles, 50 cycles, 60 cycles or 400 cycles, except, of course, for the particular components in the circuitry selected that are frequency responsive.

It is also an object of this invention to provide for no frequency drop in a system including any number of alternators connected in parallel by suitable controls of the prime movers driving the alternators.

It is also a broad object of this invention to provide for the division of the total load on a plurality of alternators connected in parallel in accordance with the individual ratings of the alternators.

It is also an object of this invention to accomplish the desired functions without the use of tubes or other fragile components having a rather limited useful life but with the use of components which have a long useful life and which will withstand shock and vibration with no damage to its components.

The objects recited are merely illustrative. Other objects and advantages will become more apparent from a study of the following specification and the accompanying drawings, in which.

Figure 3A:
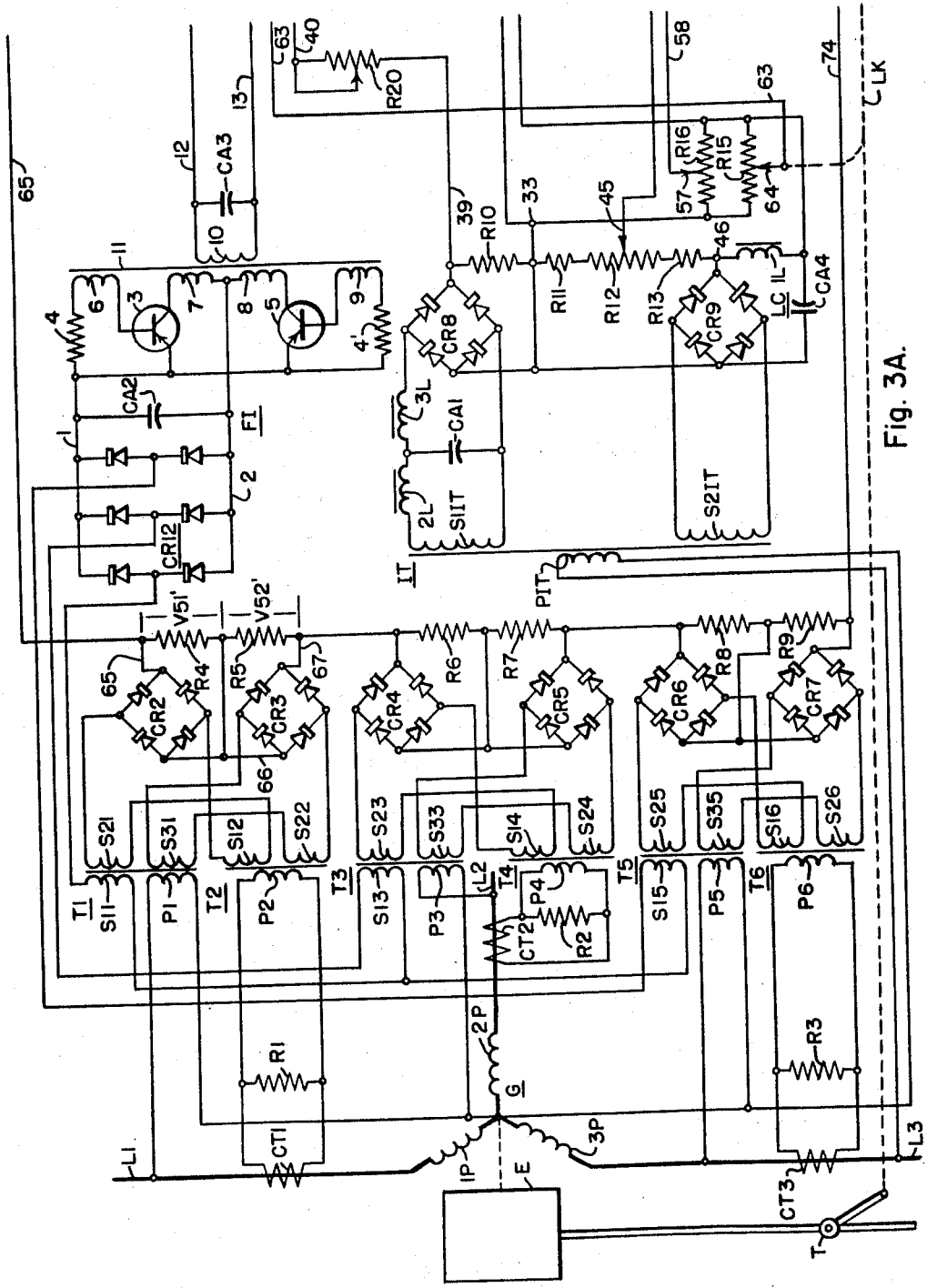
Figure 3B:
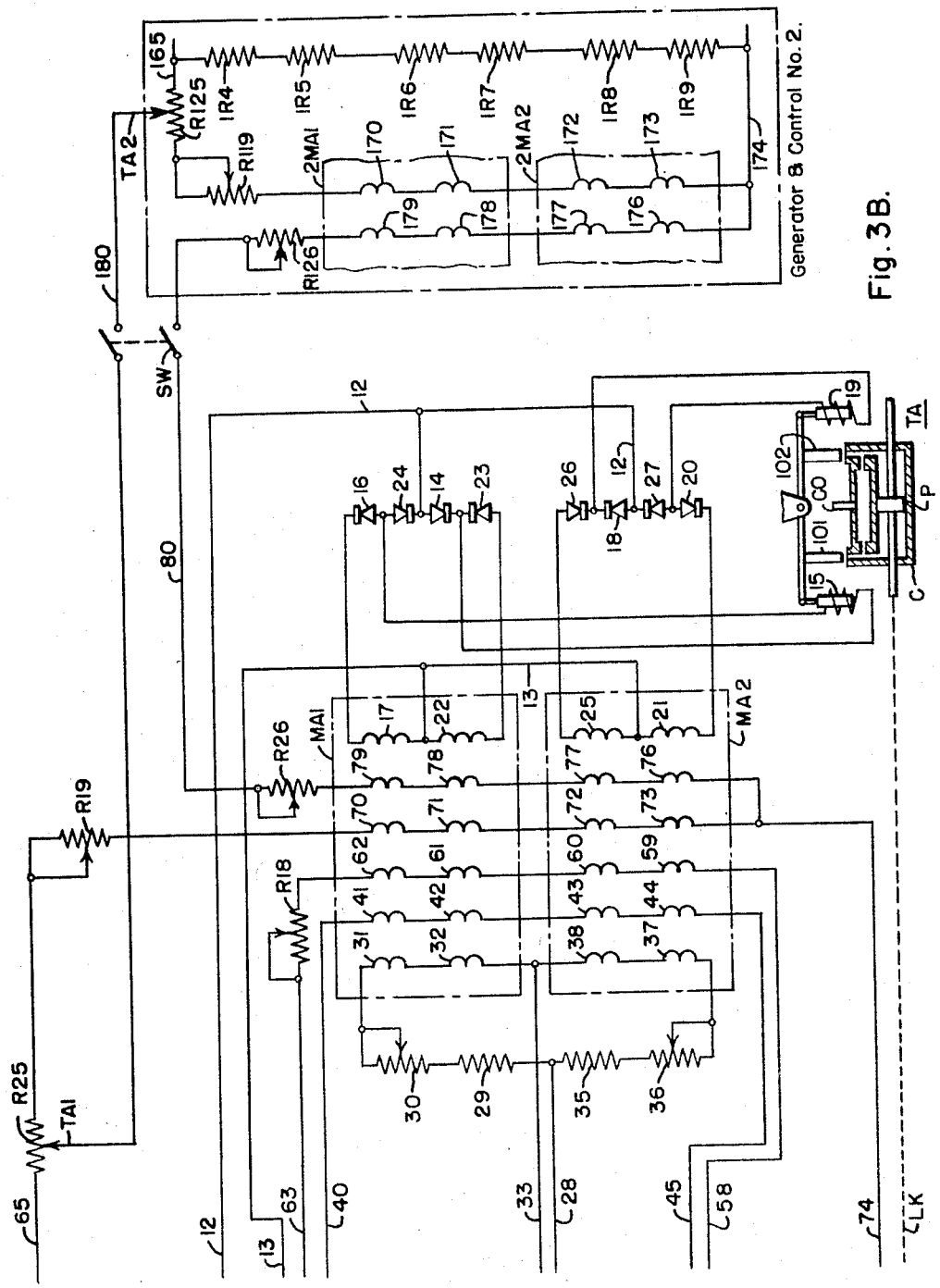
Figure 4:
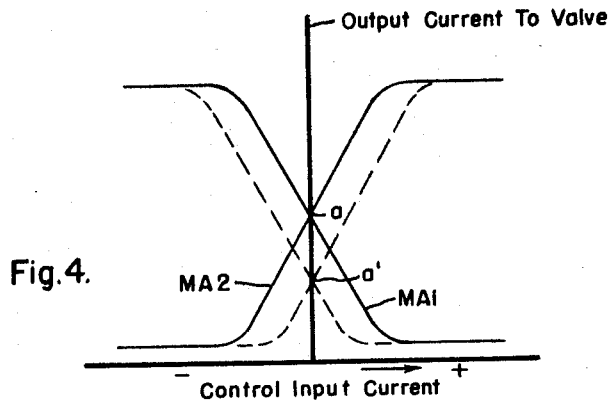
Figure 5:
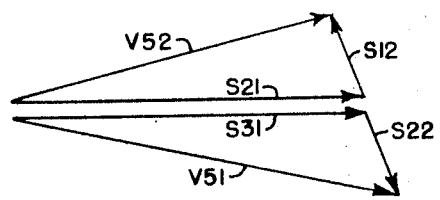
Figure 7:
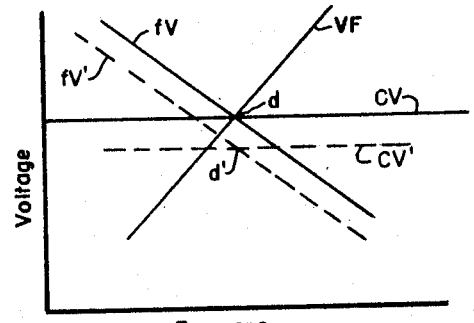
Figure 6:
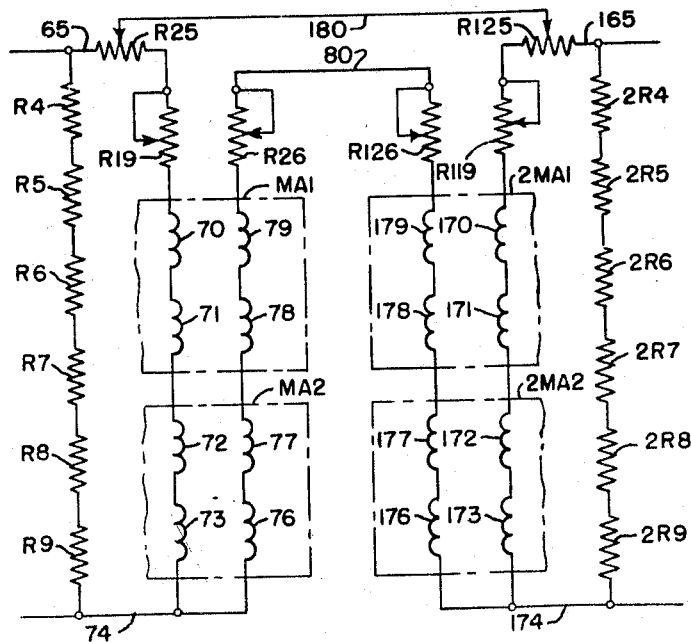

Figs. 3A and 3B together are a diagrammatic showing of the electric apparatus and the prime mover to be controlled;

Fig. 4 shows the operating characteristic of the magnetic amplifiers used;

Fig. 5 shows vector diagrams illustrating the function of the load responsive feature of the control included in this invention;

Fig. 6 is a simplified showing of the circuitry for effecting proper load sharing of alternators connected in parallel; and Fig. 7 shows some curves of value in understanding the frequency control of this invention.

Figure 1:
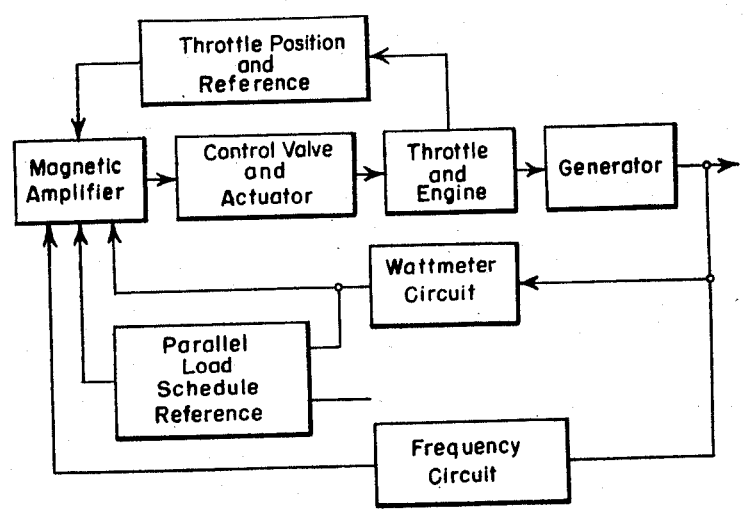
Figure 1 is a schematic showing, in block form, of the electrical elements of this invention.
Figure 2:
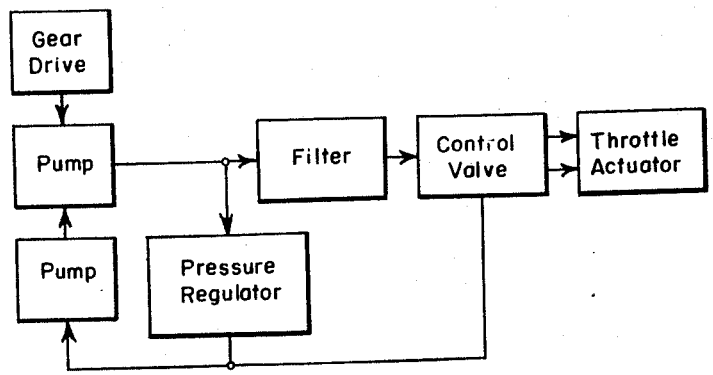
Fig. 2 is a schematic showing, in block form, of the hydraulic apparatus used with this invention.

To gain a broad understanding of this invention, a brief preliminary discussion of Figs. 1 and 2 may be helpful.

The block designated generator represents the alternator G mechanically coupled to the engine included in the block designated throttle and engine. The generator G is electrically connected to a load, not shown.

The throttle of the engine is actuated hydraulically by the control valve and actuator, which is in turn controlled electromagnetically by the output of the magnetic amplifier.

To provide for proper control of the engine throttle the magnetic amplifier is controlled as a function of the alternator frequency through the frequency circuit. To prevent hunting, and to otherwise improve operation, the magnetic amplifier is controlled by means of a negative feedback providing a throttle position reference, and also as a function of generator power output is by means of a wattmeter circuit.

When two alternators are operated in parallel a parallel load schedule reference is also provided to provide for appropriate load sharing of the two alternators.

To provide the hydraulic control a suitable pump, coupled to the engine through a suitable gear drive, pumps liquid through the filter to the control valve which effects operation of the throttle actuator. To provide for a proper constant liquid pressure in the system a pressure regulator bleeds off the proper amount of liquid from the pump to the sump.

To understand some of the details of this invention reference may be had to Figs. 3A and 3B.

The engine E is shown coupled to drive the alternator G which alternator is in use connected to supply power to leads L1, L2 and L3 and to the control apparatus.

The alternator may be Δ-connected or Y-connected but as shown is a Y-connected machine having the outer terminals of its phase windings 1P, 2P and 3P connected to the load leads L1, L2 and L3. A transformer primary winding P1 of transformer T1 is, as shown, connected across winding 1P; a transformer primary winding P3 of transformer T3 is, as shown, connected across winding 2P; and a transformer primary winding P5 of transformer T5 is, as shown, connected across winding 3P.

The transformers T1, T3 and T5 have their secondary windings S11, S13 and S15 connected to the three-phase rectifier assembly CR12 connected, as shown, to provide a direct current output on leads 1 and 2 of the frequency inverter FI. A capacitor CA2 aids in producing a substantially constant direct current voltage across leads 1 and 2 for the remaining and essential portions of the frequency inverter circuitry.

The frequency inverter circuitry further includes a pair of switching devices 3 and 5 connected to the leads 1 and 2. In this arrangement, each of the devices 3 and 5 is in the form of a three electrode semiconductor device commonly referred to as a "transistor."

The construction and function of transistors are well known in the art, but for a more detailed discussion of transistors as applied to the circuitry here shown, reference may be had to the United States Letters Patent No. 2,783,384 of Richard L. Bright et al.

The transistors here used are of the P–N–P junction type and the electrical and magnetic characteristics of the parts, as the resistors 4 and 4', electromagnetic windings 6, 7, 8, 9 and 10 and the core 11, and the capacitor CA3, are so chosen that an alternating current of approximately 1000 cycles of near square wave form appears on terminals 12 and 13.

The main windings 17 and 22 of the magnetic amplifier MA1 and the main windings 21 and 25 of magnetic amplifier MA2 are thus supplied with an alternating current of 1000 cycles and constant voltage regardless of the frequency output of the generator G. This means the units responsive to the frequency inverter may be used in any application regardless of the frequency of the generator involved. In other words, the benefits of the high-frequency magnetic amplifier and other units are available and may be used interchangeably with generators supplying either 15 cycles, 25 cycles, 50 cycles, 60 cycles or 400 cycles.

The engine is controlled by the throttle T, which is actuated by link LK from the throttle actuator TA. The throttle actuator includes a piston P in the cylinder C. Liquid under a suitable constant pressure enters conduit CO and thus provides a liquid pressure at both sides of the piston P through the system of conduits shown.

Whether or not the pressure is the same on both sides of the piston P depends on the positions of the valves 101 and 102 with respect to the discharge openings adjacent the bottom ends of the valves. The valves are actuated by push-pull electromagnets having the actuating coils 15 and 19. These coils are in the output circuits of the magnetic amplifiers MA1 and MA2, respectively. The input to the main windings of the magnetic amplifiers is provided from the alternator G, through the frequency inverter FI above discussed.

The energizing circuits for the main windings may be traced from lead 12, when lead 12 is positive, through rectifier 14, actuating coil 15 of the throttle actuator TA, rectifier 16, main winding 17 of magnetic amplifier MA1 to lead 13. Similarly, a circuit is established from conductor 12 through rectifier 18, actuating coil 19 of the throttle actuator TA, rectifier 20, main winding 21 of magnetic amplifier MA2 to lead 13.

When lead 13 is positive, a circuit is established from this lead through main winding 22 of magnetic amplifier MA1, rectifier 23, actuating coil 15, and rectifier 24 to lead 12. Similarly, a circuit is established from lead 13 through main winding 25 of magnetic amplifier MA2, rectifier 26, actuating coil 19, and rectifier 27 to lead 12. From the foregoing, it is apparent that the outputs of the magnetic amplifiers MA1 and MA2 are applied to the actuating coils 15 and 19 in a push-pull manner and the throttle actuator TA for the engine E is thus very effectively and sensitively operated from the magnetic amplifiers.

Since the magnetic amplifiers here used are of the self-saturating type, the true effective function of coils 15 and 19 is thus determined by the total effect of all the control windings on the magnetic amplifiers. The preferred point of operation of each magnetic amplifier used in this control is preferably at, or near, the mid-point of the straight portion of the operating characteristic, as at point $a$ of the operating characteristic shown in Fig. 4. The design and selection of the amplifiers is such that their operating characteristics are substantially the same. Further, the straight portion of the characteristic is preferably quite steep but not actually vertical.

To cause each magnetic amplifier to operate at or near the midpoint as point $a$ of its characteristic, the magnetic amplifiers are provided with bias windings. The bias windings are energized from the isolation transformer IT having the primary winding PIT and the secondary windings S1IT and S2IT.

The secondary winding S2IT of the isolation transformer is connected directly to the alternating current terminals of the full-wave rectifier CR9. The output of the rectifier CR9 through the LC circuit including the capacitor CA4 and reactor 1L supplies a constant substantially ripple-free direct current voltage to leads 28 and 33.

To energize the bias windings a circuit is established from the positive conductor 28, through resistor 29, bias balance adjustable resistor 30, bias windings 31 and 32 of the magnetic amplifier MA1 to the negative conductor 33.

Another energizing circuit is also established from the positive conductor 28 through resistor 35, the bias balance adjustable resistor 36, the bias windings 37 and 38 of the magnetic amplifier MA2 to negative conductor 33. Since the adjustable resistors 30 and 36 are in the circuits of the biasing windings, these resistors can be used to adjust the bias level, i.e., the "up-and-down" position on the magnetic characteristic of both magnetic amplifiers may be adjusted, as for example the dotted lines appearing in Fig. 4. Since the relative amount of resistances of the resistors 30 and 36 in the respective circuits of bias windings 31 and 32, and 37 and 38 is adjustable, it is apparent that a decrease of resistance in resistor 30 increases the excitation of bias windings 31 and 32 and an increase in resistance in resistor 36 at the same time decreases the excitation of bias windings 37 and 38. Of course, the reverse effect is caused by a reverse operation on the adjustable resistors 30 and 36.

From the discussion of the circuitry and control of the bias windings it is apparent that the operations of the magnetic amplifiers may be adjusted to any level on the operating characteristic and that balanced operation may be obtained at the levels selected.

The output terminals of rectifier CR9 are also connected to energize a potentiometer circuit. This potentiometer circuit may be traced from the positive junction 46 through resistor circuitry including resistor R13, the frequency reference potentiometer R12, and resistor R11 to the negative conductor 33. The utility of this potentiometer circuit will become apparent as the description proceeds.

The secondary winding S1IT is connected in a loop circuit with a reactor 2L, having a selected reactance value, and a capacitor CA1, having a selected capacitance value. A second reactor 3L, having a selected reactance value, and a full-wave rectifier CR8, connected through its alternating current input terminals in series with the reactor 3L, are connected in parallel to the capacitor CA1.

The direct current output terminals of full-wave rectifier CR8 are connected across resistor R10. The connection is such that the negative terminal is connected to negative conductor 33 and the positive terminal is connected to lead 39 to which the upper junction of the R10 is connected. The operating characteristics of the elements CR8, S1IT, 2L, CA1 and 3L are so selected that the voltage impressed across leads 39 and 33 is rather accurately and sensitively substantially inversely proportional to frequency over a give range which includes the desired operating frequency of the alternator G. A rise of frequency from a selected value causes a decrease in voltage across leads 39 and 33 and a decrease in frequency from a selected value causes a rise in voltage across leads 39 and 33.

As is apparent from the connections of full-wave rectifier CR9 heretofore explained and the showing in Fig. 3A, the positive terminal of rectifier SR9 is connected to junction 46 to which the lower junction of frequency reference potentiometer including resistors R13 and R12 is also connected. Since the positive potential at lead 39 is sensitively and accurately variable as a function of the minutest tendency of a change of frequency and the positive potential of lead 46 is fixed and thus constitutes a reference voltage, it is apparent that load 45 may be so positioned on resistor R12 that the volage drop across leads 39 and 45 will be a function of such minute tendency of a change of frequency.

From explanations made hereinbefore, it is apparent that the voltage drop through resistors R13, R12 and R11 is from positive to negative at junction 33. This means that tap 45 on potentiometer R12 is positive with respect to junction 33. Since junction 39 is positive with respect to junction 33, it is apparent that when the output voltage of rectifier CR9 is constant which for all normal operation of the alternator is constant, and the frequency and voltage output of secondary S2IT is constant, that tap 45 may be shifted to such a point on resistor R12 that tap 45 has the same positive voltage value as conductor 39. Shifting tap 45 merely means that curve CV is shifted up or down as required. If the alternator frequency is at the desired value, say 60 cycles, and the alternator voltage is at the desired constant value, then the voltage value across junctions 39 and 33 will be, fore example, at $d$ on curve $fV$. By shifting tap 45, the curve is shifted until it includes point $d$.

In practice, this is accomplished by shifting tap 45 in such a direction until the voltage across leads 39 and lead or tap 45 is zero. Thereafter, any departure of the frequency from the desired frequency will shift the direct current voltage across lead 39 and tap 45 along curve $fV$. If the frequency increases, lead 39 will have a lower voltage than lead 45 and when the frequency decreases, lead 45 will have a lower voltage than lead 39. The magnitude of the direct current voltage across lead 45 and lead 39 will be a measure of the magnitude of the departure of the frequency from a desired frequency and the sense, or effective polarity of the voltage, will be a function of the direction of the departure of the frequency from a desired frequency.

Changes in alternator voltage have but a small effect, but if there is such a change the outputs of the secondary windings S1IT5 and S2IT are affected substantially alike. The output from secondary S2IT during a decrease in voltage will shift curve CV to position CV', but the output of secondary S1IT will shift curve $fV$ to $fV'$. The difference voltage is still zero since point $d'$ is still at the same frequency value represented by point $d$.

By providing the magnetic amplifiers with control windings responsive to a selected portion of the voltage drop across leads 39 and 45, a control is provided as a function of the minutest departure of frequency of the alternator from a selected value. A change of the frequency of generator G with respect to a selected reference frequency suffices to produce a voltage drop across leads 39 and 45. A control effect may thus be produced in the magnetic amplifier before there is any appreciable change in speed of the prime mover. A change in throttle position may thus be effected before there is a noticeable speed change to counteract the speed change tendency.

In practice, lead 45 is adjusted to such a position on R12 that there is no voltage across leads 39 and 45 when the frequency of the generator G is just right. If for any cause there is a slight change in the frequency in such a direction that lead 39 becomes more positive than lead 45 then an energized circuit is established from lead 39 through the frequency gain adjustable resistor R20, conductor 40, control windings 41 and 42 of magnetic amplifier MA1 and control windings 43 and 44 of magnetic amplifier MA2 to lead 45. If the speed change in such that lead 45 is more positive than lead 39, then the control effect of the control windings is, of course, in an opposite sense in the respective magnetic amplifiers.

It is, of course, understood that when the lead 39 is more positive than lead 45, then the control effect in magnetic amplifier MA1 is in one sense and the control effect in magnetic amplifier MA2 is in an opposite sense, and when the lead 45 is more positive than lead 39, the control effects in the magnetic amplifiers MA1 and MA2 reverses. The effect is thus a push-pull control on the actuating coils 15 and 19.

A governor control that takes into account frequency changes only may have an excessive drooping frequency versus load characteristic and may hunt, or manifest other minor instabilities, or both. To eliminate such not quite perfect operation, a throttle position feedback control is provided for the magnetic amplifiers.

To accomplish this control a no-load throttle position adjusting potentiometer R15, is connected across leads 28 and 33 and a throttle position indicating potentiometer R16, is also connected acros leads 28 and 33.

The feedback control is then effected by the circuit from tap 57 on potentiometer R16 through conductor 58, control windings 59 and 60 of magnetic amplifier MA2, control windings 61 and 62 of magnetic amplifier MA1, position gain adjustable resistor R18, conductor 63, to tap 64 mechanically coupled to link LK and electrically contacting potentiometer R15.

Any movement of the throttle and thus tap 64 from the desired position unbalances the voltage across taps 57 and 64 and causes a current to flow in the control windings in this feedback circuit in such a direction to provide a negative push-pull feedback effect. In other words, when tap 57 is more positive than tap 64, then current flows in the direction of the circuit above traced producing a negative feedback, and when tap 64 is more positive than tap 57, then the effect on the respective magnetic amplifier is reversed but the feedback is again a negative push-pull feedback.

Frequency control and throttle position control do not completely take into account the effect on speed of load variations on the alternator. In fact, in the absence of some load compensation control the speed characteristic will have a droop.

Load sensing also anticipates frequency change. With a proper load sensing circuit and control the control of the frequency is made extremely close under conditions of changing load. Without first describing the accurate load sensing circuitry and its cooperation with the magnetic amplifiers it will, for the moment suffice, to know that the load intelligence voltage appears across leads 65 and 74, with lead 65 being positive and lead 74 being negative.

With leads 65 and 74 energized as mentioned an energized circuit is established from positive lead 65 through all of the resistor sections of the load sharing potentiometer R25, a selected number of resistor sections of the frequency regulating potentiometer R19, control windings 70 and 71 of magnetic amplifier MA1, control windings 72 and 73 of the magnetic amplifier MA2 to the negative lead 74.

By means of potentiometer R19, the magnitude of the load compensation may be adjusted and the magnitude can thus at will be adjusted to change the normally drooping speed characteristic to a substantially flat, or even rising speed characteristic.

The utility of potentiometer R25 will become apparent as the description proceeds.

The elements of the circuitry shown in Fig. 3A, including resistors R4, R5, R6, R7, R8 and R9 and rectifiers CR2, CR3, CR4, CR5, CR6 and CR7, and the transformers T1, T2, T3, T4, T5 and T6 and the supply circuitry for these elements comprise a device, broadly stated, for obtaining the product of a magnitude of a quantity represented by an alternating current voltage and the cosine of its phase angle with respect to a reference alternating current voltage of the same frequency. Such a device has many uses and possible applications, but in the arrangement herein shown and described the device is useful for obtaining an electrical control signal across leads 65 and 74 proportional to $I \cos \theta$, and is thus used as the intelligence for the electric load control provided in this combination. In the term $I \cos \theta$, I represents the load current of the alternator and $\theta$ the power factor angle. The control intelligence, for the substantially constant alternator voltage that is obtained, is thus a direct function of the total useful power output of the alternator.

Each transformer of this group has a simple loop magnetic circuit. To understand the function of this portion of the control it suffices to describe the function of transformers T1 and T2.

These two transformers T1 and T2 have primary windings P1 and P2, respectively. The primary winding P1 is connected in a loop circuit with phase winding 1P.

The phase winding 1P has a current transformer CT1 connected in a loop circuit with the resistor R1 having a relatively low resistance value. The primary winding P2 of transformer T2 is connected across this resistor R1.

The transformer T1 has the secondary windings S21 and S31, and the transformer T2 has the secondary windings S12 and S22. The circuit connection for the secondary windings S21 and S12 may be traced from the upper alternating current terminal of the rectifier CR2 to the lower alternating current terminal of rectifier CR2, from the upper terminal of S12 downwardly through secondary S12 to the lead connecting both the lower terminals of S12 and S21, upwardly through S21 to the upper terminal of rectifier CR2. Since the secondary winding S12 has an output voltage that is a function of phase current and is in opposition to the many times larger secondary voltage S21, which is a function of phase voltage, it is apparent that the direct current voltage across resistor R4 will be a function of the sum of the two vector voltages. This is shown by the upper vector diagram of Fig. 7.

The circuit connections for the secondary windings S31 and S22 may be traced from the upper alternating current terminal of rectifier CR3, the lower alternating current terminal of rectifier CR3, to the lower terminal of S22 upwardly through secondary S22, upwardly through secondary S31 to the upper alternating current terminal of rectifier CR3. Since the secondary winding S22 has an output voltage that is a function of phase current and is added to the many times larger secondary voltage S31, which is a function of phase voltage, it is apparent that the direct current voltage across resistor R5 will be a function of the sum of the two vector voltages. This is shown by the lower vector diagram of Fig. 7.

It can be seen by examining Fig. 7 that by subtracting the D.C. vectors of V52 and V51 the resultant vector will be approximately proportional to $I \cos \theta$. The relative magnitude of the voltages of T1 and T2 determine the degree of approximate accuracy. V51' is the rectified voltage vector that appears across resistor R4 and V52' is the rectified voltage vector that appears across resistor R5. The negative terminals of resistors R4 and R5 are connected by lead 66. Then the voltage on leads 65 and 67 is directly proportional to the difference of vectors V51' and V52' and is approximately proportional to $I \cos \theta$ of the generator load for phase 1P. Changes of load on the generator are instantly reflected by a change in current with the result that the output of secondary S22 and secondary S12 will be a function of the change in current. The circuitry thus provides, across resistors R4 and R5, a push-pull output proportional to the $I \cos \theta$ load on phase 1P of the generator. The output of each phase wattmeter circuit is self-balancing since the turns ratio of winding S21 to P1 is chosen to be equal to the turns ratio of winding S31 to P1 and hence does not require the output balancing potentiometers required in the prior art devices where a somewhat similar wattmeter circuitry is used. In this connection, reference may be had to the copending application of Frederic P. Emery and Harley A. Perkins, Jr., Serial No. 678,574, filed August 16, 1957 and entitled "Magnetic Amplifier Controlled Electric Governor for Prime Movers."

The phase 2P is provided with the current transformer CT2, resistor R2 and transformers T3 and T4. Transformer T3 has primary winding P3 and secondary windings S23 and S33 and transformer T4 has primary winding P4 and secondary windings S14 and S24 all of which elements are interconnected with rectifiers CR4 and CR5 and resistors R6 and R7 like the corresponding interconnection of corresponding elements used with phase 1P.

The phase 3P is provided with current transformer CT3, resistor R3, and transformers T5 and T6. Transformer T5 has primary winding P5 and secondary windings S25 and S35 and transformer T6 has primary winding P6 and secondary windings S16 and S26 all of which elements are interconnected with rectifiers CR6 and CR7 and resistors R8 and R9 like the corresponding elements are in interconnection with phase 1P and 2P.

The circuitries just discussed thus provide means for obtaining a control signal across leads 65 and 74 proportional to $I \cos \theta$ of the alternator load. This intelligence or error signal is supplied to the magnetic amplifiers by the circuit hereinbefore traced.

The foregoing description is mostly directed to a governor control for a prime mover driving one alternator. In actual practice two or more alternators, sometimes not of equal capacity, may be connected to supply a common load and are driven by separate prime movers. When this is the case, provision must be made in the control of each governor to effect proper load sharing.

The control of each prime mover and its alternator is identical to the one hereinabove disclosed. This is indicated at the right of Fig. 3A by the block designated generator and control #2.

Each control is provided with a load sharing potentiometer as R25. For the second alternator this is designated as potentiometer R125 and the output loads are designated as leads 165 and 174, corresponding to leads 65 and 74.

When a second alternator is being used and load balancing is to be effected the switch SW is closed. If there is perfect balance of the loads of the two alternators, the taps TA1 and TA2 on the potentiometers R25 and R125, respectively, are at the same potential but if there is a load unbalance a difference of potential exists between these taps and the polarity depends on the alternator which tends to take the greater load.

If alternator #2 takes the greater load, tap TA2 will be more positive than tap TA1. The result is that a control current flows from TA2 through conductor 180, switch SW, a portion of resistor R25, resistor R19, control windings 70 and 71 of magnetic amplifier MA1, control windings 72 and 73 of magnetic amplifier MA2, conductor 74, control windings 76 and 77 of magnetic amplifier MA2, control windings 78 and 79 of magnetic amplifier MA1, resistor R26, switch SW, resistor R126, control windings 179 and 178 of magnetic amplifier 2MA1, control windings 177 and 176 of magnetic amplifier 2MA1, and to lead 174 completing the circuit of the wattmeter output from set #2.

When the polarity on taps TA1 and TA2 is reversed, then the current in the circuit of the control windings 176, 177, 178, 179, 79, 78, 77, 76, 173, 172, 171, and 170, is reversed. In the first case the load on generator G is increased and that of the second generator is decreased and in the second case the operation is opposite.

By suitable adjustment of the taps TA1 and TA2 on the potentiometer R25 and R125, the load sharing may be adjusted in accordance with the capacity of the alternators. The control is thus not limited to prime-mover generator-sets of equal capacity. This load sharing circuit thus produces an electrical output proportional to percentage load unbalance between parallel generators.

From the foregoing it will be noted that all the electrical control signals are added and amplified by the magnetic amplifiers to give an electrical signal that will enable the remaining circuitry to maintain constant generator frequency.

The magnetic amplifier operates the electro-hydraulic valve which amplifies the electrical signal and operates the double ended hydraulic piston P which positions the prime mover throttle.

To briefly summarize some of the advantages of this invention it is to be noted that the control:

(a) Enables the prime mover to hold closer steady-state control of frequency;

(b) Enables the prime mover to anticipate sooner than with previous control, a change in frequency due to a change in load and to correct the throttle setting before there is an actual change in frequency;

(c) Permits the use of cheaper components and smaller components with an overall higher standard of performance; and (d) Permits interchangeable use of all parts, except the frequency responsive parts, on 15 cycles, 25 cycles, 50 cycles, 60 cycles and 400 cycles.

The description made is for apparatus particularly designed for 50 cycle, 60 cycle and 400 cycle operation. If any other frequency of operation is contemplated, merely the frequency responsive control circuitry need be changed.

While but one embodiment of the invention has been disclosed it is to be understood that the invention is capable of various adaptations for example to controls which permit the governor to maintain alternators at any practical frequency and that still other changes and modifications may be made which all fall within the spirit of the invention. The subject matter claimed is presented in the following claims.

I claim as my invention:

1. In an electric system of control for maintaining the frequency of the alternating current output of an alternator coupled to a prime mover constant, in combination, a throttle for the prime mover, which throttle in use is operable to change the speed of the prime mover with reference to a selected constant speed, electromechanical means for effecting the operation of the throttle, magnetic amplifier means of a relatively high frequency type for energizing the electromechanical means, means for energizing the magnetic amplifier means from terminals energized with an alternating current of relatively high constant frequency, control means, operable as a function of the frequency of the alternating current output of said alternator, for controlling the operation of the magnetic amplifier means, second control means responsive to throttle position with reference to a selected position for providing a negative control effect on said magnetic amplifier means, and third control means responsive to the useful power output of the alternator for providing a positive control effect on said magnetic amplifier means.

2. In an electric system of control for maintaining the frequency of the alternating current output of an alternator coupled to a prime mover at a predetermined frequency, in combination, a throttle for the prime mover, which throttle in use is operable to change the speed of the prime mover, electromechanical means for effecting the operation of the throttle to change the prime mover speed, high frequency type magnetic amplifier means for energizing the electromechanical means, means for energizing the magnetic amplifier means from terminals energized with an alternating current of relatively high constant frequency, control means for providing a reference signal as a function of the frequency variation of the alternating current output of said alternator from said predetermined frequency for controlling the operation of the magnetic amplifier means, and further control means responsive to the useful power output of the alternator for providing a further control effect on said magnetic amplifier means.

3. In an electrical system of control for maintaining the frequency of the alternating current output of an alternator coupled to a prime mover at a predetermined frequency, in combination, a throttle for the prime mover, which throttle in use in operable to change the speed of the prime mover, electromechanical means for effecting the operation of the throttle, high frequency type magnetic amplifier means for energizing the electromechanical means, means for energizing the magnetic amplifier means at a constant high frequency, control means, operable as a function of a frequency variation of the alternating current output of said alternator from said predetermined frequency, for controlling the operation of the magnetic amplifier means, and further control means responsive to throttle position with reference to a selected position for providing a negative control effect on said magnetic amplifier means.

4. In an electric system of control for maintaining the frequency of the alternating current output of an alternator coupled to a prime mover at a predetermined frequency, in combination, a throttle for the prime mover, which throttle in use is operable to change the speed of the prime mover, electromechanical means for effecting the operation of the throttle, high frequency type magnetic amplifier means for energizing the electromechanical means, means for energizing the magnetic amplifier means at a constant relatively high frequency, and control means, operable as a function of a difference comparison of the frequency of the alternator coupled to the prime mover with reference to said predetermined frequency, for controlling the operation of the magnetic amplifier means.

5. In an electric system of control for controlling the speed of a prime mover, the combination of, a throttle for the prime mover, electromagnetic means for effecting the actuation of the throttle to thus control the speed of the prime mover in accordance with the energization of said electromagnetic means, said prime mover in use being coupled to means for generating an alternating current, a frequency inverter, magnetic amplifier means having its input windings through said inverter connected to the alternator and its output windings connected to energize said electromagnetic means, said magnetic amplifier means having control windings energized by a direct current that is proportional to the difference between constant voltages a predetermined frequency sensitive reference voltage.

6. In an electric system of control for controlling the speed of a prime mover, the combination of, a throttle for the prime mover, electromagnetic means for effecting the actuation of the throttle to thus control the speed of the prime mover in accordance with the energization of said electromagnetic means, said prime mover in use being coupled to generating means for generating an alternating current of a selected frequency, circuit means including current rectifying means connected to said generating means for producing as a reference signal a constant direct current voltage independent of changes in frequency of the current produced by said generating means, second circuit means including rectifying means also connected to the generating means for producing a direct current voltage proportional to frequency, third circuit means including a frequency inverter connected to the alternator, high frequency type magnetic amplifier means having its output windings connected to energize said electromagnetic means and connected to be energized from the output of the inverter, said magnetic amplifier means having a control winding energized by a direct current that is proportional to the difference between the voltage of the reference signal and the voltage proportional to the frequency of the alternating current generated by the generating means coupled to the prime mover.

7. In an electric system of control for controlling the speed of a prime mover, the combination of, a throttle for the prime mover, electromagnetic means for effecting the actuation of the throttle to thus control the speed of the prime mover in accordance with the energization of said electromagnetic means, said prime mover in use being coupled to generating means for generating an alternating current of a selected voltage and frequency, circuit means connected to said generating means for producing a direct current voltage proportional to any change in the frequency of the alternating current generated by said generating means, a source of direct current voltage of a constant value, mixing circuitry for said direct current voltage proportional to changes in frequency and said direct current voltage of constant value to provide an output as a function of the difference of said direct current voltages, a source of high frequency voltage, high frequency type magnetic amplifier means having its output windings energized from said source of high frequency voltage and connected to energize said electromagnetic means, said magnetic amplifier means having control windings energized by said direct current voltage output of said mixing circuitry.

8. In an electric system of control for maintaining the frequency of the alternating current output of an alternator coupled to a prime mover constant, in combination, a throttle for the prime mover, which throttle in use is operable to change the speed of the prime mover with reference to a selected constant speed, electromechanical means for effecting the operation of the throttle, a source of high frequency alternating current voltage, high frequency type magnetic amplifier means connected to said source for energizing the electromechanical means, control means, operable as a function of the frequency of the alternating current output of said alternator, for controlling the operation of the magnetic amplifier means, second control means responsive to throttle position with reference to a selected position for providing a negative control effect on said magnetic amplifier means, third control means responsive to the useful power output of the alternator for providing a positive control effect on said magnetic amplifier means, a second electric system of control and apparatus to be controlled as hereinbefore recited, and further control means responsive to the difference of the useful power outputs of the two alternators thus involved for controlling the relative effects of the two magnetic amplifier means involved to balance the loads on the two alternators.

9. In an electric system of control for maintaining frequency of the alternating current output of an alternator coupled to a prime mover at a predetermined frequency, in combination, a throttle for the prime mover, which throttle in use is operable to change the speed of the prime mover, electromechanical means for effecting the operation of the throttle to change the prime mover speed, a source of high frequency constant voltage alternating current, high frequency type magnetic amplifier means connected to said source for energizing the electromechanical means, control means for providing a reference signal as a function of the frequency variation of the alternating current output of said alternator from said predetermined frequency for controlling the operation of the magnetic amplifier means, further control means responsive to the useful power output of the alternator for providing a further control effect on said magnetic amplifier means, a second electric system of control and apparatus to be controlled as hereinbefore recited, and still further control means responsive to the difference of the useful power outputs of the two alternators thus involved for controlling the relative effects of the two magnetic amplifier means involved to balance the loads of the two alternators.

10. In electric control apparatus for controlling the operation of a prime mover, said control apparatus including an alternating current generator coupled to the prime mover, isolation transformer means connected to the generator, first rectifying means, connected to the transformer means, for producing a constant voltage direct current output, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, a source of high frequency alternating current, high frequency type magnetic amplifier means having main windings energized from said source of high frequency and having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference.

11. In electric control apparatus for controlling the operation of a prime mover, said control apparatus including an alternating current generator coupled to the prime mover, isolation transformer means connected to the generator, first rectifying means, connected to the transformer means, for producing a constant voltage direct current output, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, a source of high frequency alternating current, high frequency type magnetic amplifier means having main windings energized from said source of high frequency and having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference, a second prime mover, and control apparatus like the control apparatus hereinabove recited, and means responsive to an unbalance in the load on the generators in the two control apparatus for oppositely controlling the two electric amplifier means to effect a balanced loading of the generators.

12. In electric control apparatus for controlling the operation of a prime mover, said control apparatus including an alternating current generator coupled to the prime mover, isolation transformer means connected to the generator, first rectifying means, connected to the transformer means, for producing a constant voltage direct current output, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, a source of high frequency alternating current, high frequency type magnetic amplifier means having main windings energized from said source of high frequency and having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference, and second control means responsive to the position of said conrtol member with reference to a predetermined control position for providing a negative control effect on said electrical amplifier means.

13. In electric control apparatus for controlling the operation of a prime mover, said control apparatus including an alternating current generator coupled to the prime mover, isolation transformer means connected to the generator, first rectifying means, connected to the transformer means, for producing a constant voltage direct current output, LC circuitry including second rectifying means, also connected to the transformer means, for producing a direct current output highly sensitive to the minutest change in frequency of the generator, the combination of a control member for said prime mover, electromagnetic means for controlling the position of said control member to thereby control the operation of said prime mover in accordance with the energization of said electromagnetic means, a source of high frequency alternating current, high frequency type magnetic amplifier means having main windings energized from said source of high frequency and having its output connected to energize said electromagnetic means, control means connected to said first and second rectifying means for controlling said electrical amplifier means as a function of the voltage difference between said first rectifying means and said second rectifying means to thus effect energization of said electromagnetic means in accordance with said voltage difference, and second control means responsive to the position of said control member with reference to a predetermined control position for providing a negative control effect on said electrical amplifier means, a second prime mover, and control apparatus like the control apparatus hereinabove recited, and means responsive to an unbalance in the load on the generators in the two control apparatus for oppositely controlling the two electric amplifier means to effect a balanced loading of the generators.

14. In an electric system of control for maintaining the frequency of an alternator coupled to a prime mover constant, in combination, a prime mover, a throttle for the prime mover, which throttle in use is operable to change the speed of the prime mover with reference to a selected constant speed, an alternator coupled to the prime mover, electromechanical means for effecting the operation of the throttle, high frequency type magnetic amplifier means having main windings including rectifiers for effecting self-saturation of the magnetic amplifier means, said magnetic amplifier means having a plurality of control windings, frequency inverter circuitry for producing an output having a relatively high frequency, transformer means connected to the alternator, rectifying means connected to the transformer means for producing a substantially constant direct current voltage at the output terminals of the rectifying means, said frequency inverter circuitry having its input terminals connected to the output terminals of the rectifying means and having its high frequency output terminals interconnected with the main windings of the magnetic amplifier means, the main windings of the magnetic amplifier means being also interconnected with the electromechanical means for effecting operation of the throttle, control means for effecting the energization of certain of the control windings of the magnetic amplifier means as a function of any departure of the alternator frequency from a selected frequency, and further control means responsive to throttle position with reference to a selected position for energizing with a negative effect certain other control windings of said magnetic amplifier means.

15. In an electric system of control for maintaining the frequency of an alternator coupled to a prime mover constant, in combination, a prime mover, a throttle for the prime mover, which throttle in use is operable to change the speed of the prime mover with reference to a selected constant speed, an alternator coupled to the prime mover, electromechanical means for effecting the operation of the throttle, high frequency type magnetic amplifier means having main windings including rectifiers for effecting self-saturation of the magnetic amplifier means, said magnetic amplifier means having a plurality of control windings, frequency inverter circuitry for producing an alternating current output of a relatively high frequency, transformer means connected to the alternator, rectifying means connected to the transformer means for producing a substantially constant direct current voltage at the output terminals of the rectifying means, said frequency inverter circuitry having its input terminals connected to the output terminals of the recifying means and having its high frequency output terminals interconnected with the main windings of the magnetic amplifier means, the main windings of the magnetic amplifier means being also interconnected with the electromechanical means for effecting operation of the throttle, control means for effecting the energization of certain of the control windings of the magnetic amplifier means as a function of any departure of the alternator frequency from a selected frequency, further control means responsive to throttle position with reference to a selected position for energizing with a negative effect certain other control windings of said magnetic amplifier means, and third control means for energizing still certain other control windings of the magnetic amplifier means as a function of the useful power output of the alternator.

16. In an electric system of control for maintaining the frequency of the alternating current output of an alternator coupled to a prime mover constant, in combination, a throttle for the prime mover, which throttle in use is operable to change the speed of the prime mover with reference to a selected constant speed, electromechanical means for effecting the operation of the throttle, magnetic amplifier means of a relatively high frequency type for energizing the electromechanical means, means for energizing the magnetic amplifier means from terminals energized with an alternating current of relatively high constant frequency, control means, operable as a function of the frequency of the alternating current output of said alternator, for controlling the operation of the magnetic amplifier means, second control means responsive to throttle position with reference to a selected position for providing a negative control effect on said magnetic amplifier means, and third control means responsive to the useful power output of the alternator for providing a positive control effect on said magnetic amplifier means, said third control means comprising one circuit including a first transformer having a primary winding connected across one phase of the alternator and having two secondary windings having the same turns ratio to the primary winding, a second transformer having a primary winding connected to be energized in proportion to the load current in said one phase of the alternator, and having two secondary windings having much fewer turns than the secondary windings of the first transformer, a pair of full-wave rectifiers, the alternating current circuit of one rectifier including in series connection one secondary winding of the first transformer and one secondary winding of the second rectifier, the secondary windings being connected in opposition, the alternating current circuit of the other rectifier including in series connection the other secondary winding of the first transformer and the other secondary winding of the second transformer, the secondary windings being connected additively, a pair of series connected impedances connected to the positive terminals of the rectifiers with the common junction between the impedances being connected to the negative terminals of the rectifier, whereby the voltage across the impedances is substantially proportionally to $I \cos \theta$ of the alternator load for one phase, two other like circuits interconnected respectively with the other two phases of the alternator, whereby an output is obtained across all the impedances of the three circuits that is substantially a function of the useful power output of the alternator.

17. In an electric system of control for maintaining the frequency of the alternating current output of an alternator coupled to a prime mover at a predetermined frequency, in combination, a throttle for the prime mover, which throttle in use is operable to change the speed of the prime mover, electromechanical means for effecting the operation of the throttle to change the prime mover speed, high frequency type magnetic amplifier means for energizing the electromechanical means, means for energizing the magnetic amplifier means from terminals energized with an alternating current of relatively high constant frequency, control means for providing a reference signal as a function of the frequency variation of the alternating current output of said alternator from said predetermined frequency for controlling the operation of the magnetic amplifier means, and further control means responsive to the useful power output of the alternator for providing a further control effect on said magnetic amplifier means, said third control means comprising one circuit including a first transformer having a primary winding connected across one phase of the alternator and having two secondary windings having the same turns ratio to the primary winding, a second transformer having a primary winding connected to be energized in proportion to the load current in said one phase of the alternator, and having two secondary windings having much fewer turns than the secondary windings of the first transformer, a pair of full-wave rectifiers, the alternating current circuit of one rectifier including in series connection one secondary winding of the first transformer and one secondary winding of the second rectifier, the secondary windings being connected in opposition, the alternating current circuit of the other rectifier including in series connection the other secondary winding of the first transformer and the other secondary winding of the second transformer, the secondary windings being connected additively, a pair of series connected impedances connected to the positive terminals of the rectifiers with the common junction between the impedances being connected to the negative terminals of the rectifier, whereby the voltage across the impedances is substantially proportional to $I \cos \theta$ of the alternator load for one phase, two other like circuits interconnected respectively with the other two phases of the alternator, whereby an output is obtained across all the impedances of the three circuits that is substantially a function of the useful power output of the alternator.

18. In an electric system of control for maintaining the frequency of the alternating current output of an alternator coupled to a prime mover constant, in combination, a throttle for the prime mover, which throttle in use is operable to change the speed of the prime mover with reference to a selected constant speed, electromechanical means for effecting the operation of the throttle, a source of high frequency alternating current voltage, high frequency type magnetic amplifier means connected to said source for energizing the electromechanical means, control means, operable as a function of the frequency of the alternating current output of said alternator, for controlling the operation of the magnetic amplifier means, second control means responsive to throttle position with reference to a selected position for providing a negative control effect on said magnetic amplifier means, third control means responsive to the useful power output of the alternator for providing a positive control effect on said magnetic amplifier means, said third control means comprising one circuit including a first transformer having a primary winding connected across one phase of the alternator and having two secondary windings having the same turns ratio to the primary winding, a second transformer having a primary winding connected to be energized in proportion to the load current in said one phase of the alternator, and having two secondary windings having much fewer turns than the secondary windings of the first transformer, a pair of full-wave rectifiers, the alternating current circuit of one rectifier including in series connection one secondary winding of the first transformer and one secondary winding of the second rectifier, the secondary windings being connected in opposition, the alternating current circuit of the other rectifier including in series connection the other secondary winding of the first transformer and the other secondary winding of the second transformer, the secondary windings being connected additively, a pair of series connected impedances connected to the positive terminals of the rectifiers with the common junction between the impedances being connected to the negative terminals of the rectifier, whereby the voltage across the impedances is substantially proportional to $I \cos \theta$ of the alternator load for one phase, two other like circuits interconnected respectively with the other two phases of the alternator, whereby an output is obtained across all the impedances of the three circuits that is substantially a function of the useful power output of the alternator, a second electric system of control and apparatus to be controlled as hereinbefore recited, and further control means responsive to the difference of the useful power outputs of the two alternators thus involved for controlling the relative effects of the two magnetic amplifier means involved to balance the loads on the two alternators.

19. In an electric system of control for maintaining frequency of the alternating current output of an alternator coupled to a prime mover at a predetermined frequency, in combination, a throttle for the prime mover, which throttle in use is operable to change the speed of the prime mover, electromechanical means for effecting the operation of the throttle to change the prime mover speed, a source of high frequency constant voltage alternating current, high frequency type magnetic amplifier means connected to said source for energizing the electromechanical means, control means for providing a reference signal as a function of the frequency variation of the alternating current output of said alternator from said predetermined frequency for controlling the operation of the magnetic amplifier means, further control means responsive to the useful power output of the alternator for providing a further control effect on said magnetic amplifier means, said third control means comprising one circuit including a first transformer having a primary winding connected across one phase of the alternator and having two secondary windings having the same turns ratio to the primary winding, a second transformer having a primary winding connected to be energized in proportion to the load current in said one phase of the alternator, and having two secondary windings having much fewer turns than the secondary windings of the first transformer, a pair of full-wave rectifiers, the alternating current circuit of one rectifier including in series connection one secondary winding of the first transformer and one secondary winding of the second rectifier, the secondary windings being connected in opposition, the alternating current circuit of the other rectifier including in series connection the other secondary winding of the first transformer and the other secondary winding of the second transformer, the secondary windings being connected additively, a pair of series connected impedances connected to the positive terminals of the rectifiers with the common junction between the impedances being connected to the negative terminals of the rectifier, whereby the voltage across the impedances is substantially proportional to $I \cos \theta$ of the alternator load for one phase, two other like circuits interconnected respectively with the other two phases of the alternator, whereby an output is obtained across all the impedances of the three circuits that is substantially a function of the useful power output of the alternator, a second electric system of control and apparatus to be controlled as hereinbefore recited, and still further control means responsive to the difference of the useful power outputs of the two alternators thus involved for controlling the relative effects of the two magnetic amplifier means involved to balance the loads of the two alternators.

20. In an electric system of control for maintaining the frequency of an alternator coupled to a prime mover constant, in combination, a prime mover, a throttle for the prime mover, which throttle in use is operable to change the speed of the prime mover with reference to a selected constant speed, an alternator coupled to the prime mover, electromechanical means for effecting the operation of the throttle, high frequency type magnetic amplifier means having main windings including rectifiers for effecting self-saturation of the magnetic amplifier means, said magnetic amplifier means having a plurality of control windings, frequency inverter circuitry for producing an alternating current output of a relatively high frequency, rectifying transformer means connected to the alternator, rectifying means connected to the transformer means for producing a substantially constant direct current voltage at the output terminals of the rectifying means, said frequency inverter circuitry having its input terminals connected to the output terminals of the rectifying means and having its high frequency output terminals interconnected with the main windings of the magnetic amplifier means, the main windings of the magnetic amplifier means being also interconnected with the electromechanical means for effecting operation of the throttle, control means for effecting the energization of certain of the control windings of the magnetic amplifier means as a function of any departure of the alternator frequency from a selected frequency, further control means responsive to throttle position with reference to a selected position for energizing with a negative effect certain other control windings of said magnetic amplifier means, and third control means for energizing still certain other control windings of the magnetic amplifier means as a function of the useful power output of the alternator, said third control means comprising one circuit including a first transformer having a primary winding connected across one phase of the alternator and having two secondary windings having the same turns ratio to the primary winding, a second transformer having a primary winding connected to be energized in proportion to the load current in said one phase of the alternator, and having two secondary windings having much fewer turns than the secondary windings of the first transformer, a pair of full-wave rectifiers, the alternating current circuit of one rectifier including in series connection one secondary winding of the first transformer and one secondary winding of the second rectifier, the secondary windings being connected in opposition, the alternating current circuit of the other rectifier including in series connection the other secondary winding of the first transformer and the other secondary winding of the second transformer, the secondary windings being connected additively, a pair of series connected impedances connected to the positive terminals of the rectifiers with the common junction between the impedances being connected to the negative terminals of the rectifier, whereby the voltage across the impedances is substantially proportional to $I \cos \theta$ of the alternator load for one phase, two other like circuits interconnected respectively with the other two phases of the alternator, whereby an output is obtained across all the impedances of the three circuits that is substantially a function of the useful power output of the alternator.

References Cited in the file of this patent

UNITED STATES PATENTS

| 2,558,729 | Buechler | July 3, 1951 |
| 2,780,733 | Chyba | Feb. 5, 1957 |